T. H. HOWELL.
TWINE CUTTER.
APPLICATION FILED SEPT. 6, 1912.
1,074,864.
Patented Oct. 7, 1913.
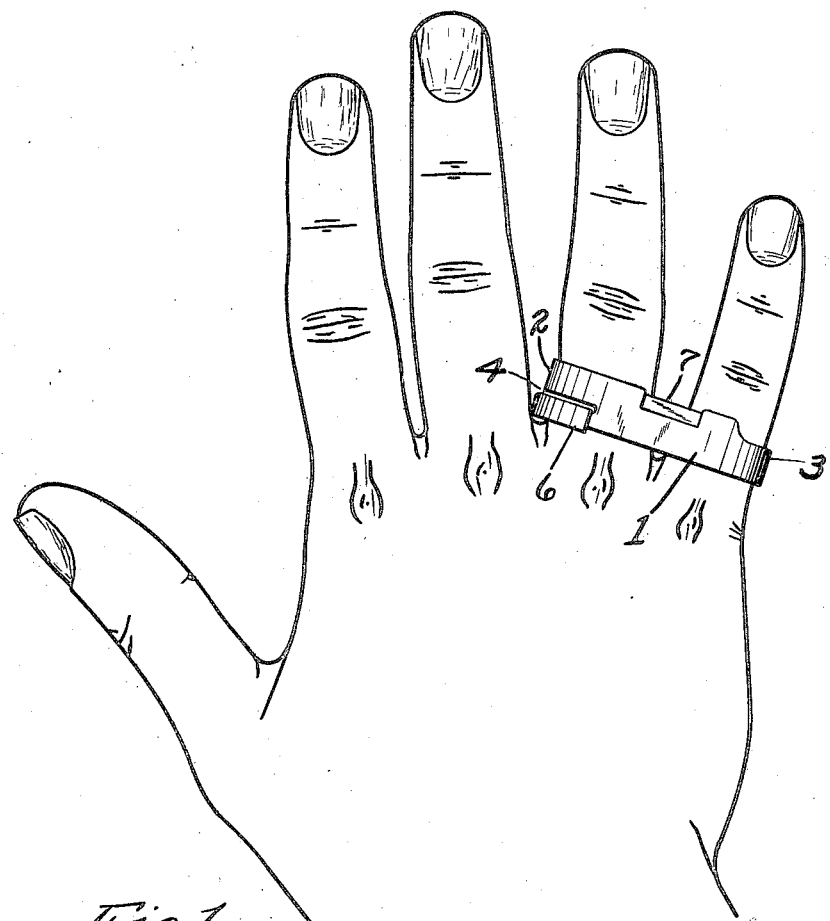
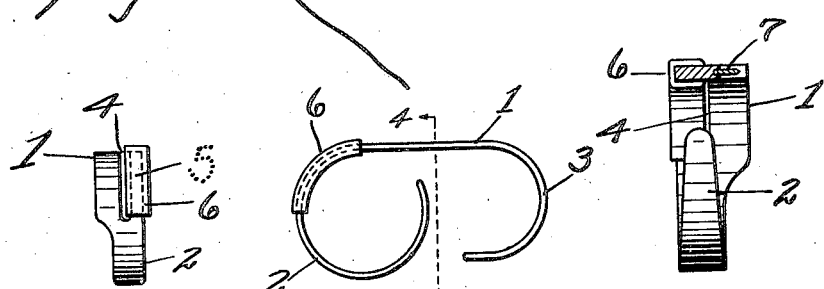

UNITED STATES PATENT OFFICE.

THOMAS H. HOWELL, OF BARNESVILLE, OHIO.

TWINE-CUTTER.

1,074,864.  Specification of Letters Patent.  Patented Oct. 7, 1913.

Application filed September 6, 1912. Serial No. 718,859.

*To all whom it may concern:*

Be it known that I, THOMAS H. HOWELL, a citizen of the United States, residing at Barnesville, in the county of Belmont and State of Ohio, have invented certain new and useful Improvements in Twine-Cutters, of which the following is a specification.

My invention relates to an improvement in twine cutters and is particularly directed to the provision of a device designed to be retained upon two fingers of the hand and constructed to permit of comparative freedom of use of the hand while at the same time affording a cutting edge for the twine, which is readily accessible by a slight spreading of the fingers upon which the device is mounted. It is calculated to form the said device in such a manner as to permit of sufficient freedom to render possible this spreading of the fingers without discomfort and yet to preclude the accidental loss of the device from the hand.

Furthermore, my invention contemplates the provision of such a structure of cutting device that all danger of chafing of the hand or fingers thereof is obviated and guarded against.

The preferred embodiment of my invention is shown in the accompanying drawings, in which similar characters of reference designate corresponding parts, and in which—

Figure 1 is a representation of a hand with my attachment applied to the last two fingers thereof, Fig. 2 is a side elevation of my improved twine cutter, Fig. 3 is a view looking at the right end of the device shown in Fig. 2, and, Fig. 4 is a section taken on line 4—4 of Fig. 2.

In the drawings, the twine cutter is shown as comprising a back strip 1 having a curled and practically complete circular portion 2 integrally formed upon one end thereof. The opposite end is likewise curved to U-form as at 3 and the portions 2 and a are so spaced with relation to each other that two adjacent fingers of the hand may be disposed therein respectively and may have considerable freedom of movement so as to permit spreading in a manner shown in Fig. 1. The left hand side of the twine cutter is desirably provided with a slot 4 forming an integral strip member 5 which is desirably embraced by a pad 6 of any suitable material. This pad when placed upon the strip 5 is in the proper position to preclude a rubbing of the adjacent finger by the edge of the twine cutter. At a point substantially intermediate the length of the portion 1 of the twine cutter, its forward edge is provided with a blade 7, or such forward edge may be sharpened at its point to form a cutting edge without the application of any independent blade.

It will be apparent that a twine cutter of the form shown and described may be readily applied to the hand and be held thereon without effort, while at all times presenting its blade in a position to facilitate cutting of the twine.

The device is particularly suited for use by mail clerks, but is, of course, not limited to this use.

What I claim, is:

1. A twine cutter comprising a strip body portion formed to embrace adjacent fingers of the hand, and a cutting edge about midway on and substantially parallel with the forward edge of said body portion.

2. A twine cutter comprising a strip body portion having its under side formed to embrace adjacent fingers of the hand and having its upper side substantially flat, and a cutting edge about midway on and substantially parallel with the upper forward edge of said body portion.

3. A twine cutter comprising a strip body portion having its under side formed to embrace adjacent fingers of the hand and having a substantially flat upper side with a cut-out portion about midway therein, and a cutter located in said cut-out portion and having its sharpened edge substantially parallel with the upper forward edge of said body portion.

4. A twine cutter comprising a strip body portion having both its end portions bent to form embracing means for adjacent fingers of the hand, a cutter carried about midway on the upper portion of said body portion and having its sharpened edge substantially parallel with the upper forward edge of said body portion, and a pad secured to said body portion to prevent chafing of the hand.

In testimony whereof I affix my signature in presence of two witnesses.

THOMAS H. HOWELL.

Witnesses:
J. W. CHAPPELL,
W. O. CHAPPELL.